(12) United States Patent
Mun et al.

(10) Patent No.: US 11,964,594 B2
(45) Date of Patent: Apr. 23, 2024

(54) DEVICE FOR PREVENTING ROTATION OF VEHICLE SEAT RAIL

(71) Applicant: Hyundai Transys Inc., Seosan-si (KR)

(72) Inventors: Hwa Young Mun, Hwaseong-si (KR); Kyeong Ju Kim, Hwaseong-si (KR); Cheol Hwan Yoon, Hwaseong-si (KR); Jung Bin Lee, Hwaseong-si (KR); Jun Sik Hwang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 18/018,899

(22) PCT Filed: Jul. 30, 2021

(86) PCT No.: PCT/KR2021/009944
§ 371 (c)(1),
(2) Date: Jan. 31, 2023

(87) PCT Pub. No.: WO2022/030887
PCT Pub. Date: Feb. 10, 2022

(65) Prior Publication Data
US 2023/0302965 A1 Sep. 28, 2023

(30) Foreign Application Priority Data

Aug. 3, 2020 (KR) .................. 10-2020-0096527

(51) Int. Cl.
*B60N 2/00* (2006.01)
*B60N 2/07* (2006.01)
*B60N 2/08* (2006.01)

(52) U.S. Cl.
CPC .............. *B60N 2/0722* (2013.01); *B60N 2/08* (2013.01)

(58) Field of Classification Search
None
See application file for complete search history.

(56) References Cited

U.S. PATENT DOCUMENTS

| | | | |
|---|---|---|---|
| 5,653,506 A | 8/1997 | Wisner et al. | |
| 6,152,415 A * | 11/2000 | Seki | B60N 2/085 248/430 |
| 6,648,292 B2 * | 11/2003 | Flick | B60N 2/0715 297/344.1 |
| 7,597,292 B2 * | 10/2009 | Kayumi | B60N 2/0705 248/157 |

(Continued)

FOREIGN PATENT DOCUMENTS

| | | |
|---|---|---|
| DE | 10046203 A1 | 6/2002 |
| DE | 102011050268 A1 | 11/2011 |

(Continued)

OTHER PUBLICATIONS

Office Action of Oct. 10, 2023 from German Patent Application No. 112021004127.4.

*Primary Examiner* — Steven M Marsh
(74) *Attorney, Agent, or Firm* — QUANTUM PATENT LAW FIRM; Seongyoune Kang (57) ABSTRACT

A device for preventing rotation of a vehicle seat rail is described. The device prevents an upper rail on the center side of a vehicle from rotating when a forward load is applied to a vehicle seat, thereby preventing a lock plate from being fractured due to rotation of the upper rail.

8 Claims, 7 Drawing Sheets

(56) References Cited

U.S. PATENT DOCUMENTS

| | | | | |
|---|---|---|---|---|
| 8,550,420 B2* | 10/2013 | Wojatzki | .............. | B60N 2/0806 |
| | | | | 296/65.13 |
| 10,118,506 B2 | 11/2018 | Hattori et al. | | |
| 10,434,904 B2* | 10/2019 | Sato | ..................... | B60N 2/7052 |
| 2007/0069098 A1* | 3/2007 | Kojima | ................ | B60N 2/0818 |
| | | | | 248/429 |
| 2011/0278420 A1 | 11/2011 | Kitamura et al. | | |

FOREIGN PATENT DOCUMENTS

| | | | | |
|---|---|---|---|---|
| FR | 3026994 A1 * | 4/2016 | ........... | B60N 2/0705 |
| JP | 2010-264961 A | 11/2010 | | |
| JP | 2013-112041 A | 6/2013 | | |
| JP | 2017-197080 A | 11/2017 | | |
| KR | 10-2005-0058096 A | 6/2005 | | |
| KR | 10-2013-0092177 A | 8/2013 | | |
| KR | 101518649 B1 | 5/2015 | | |

* cited by examiner

DEVICE FOR PREVENTING ROTATION OF VEHICLE SEAT RAIL

CROSS-REFERENCE TO RELATED APPLICATIONS

This patent application is a U.S. national stage application of International Application No. PCT/KR2021/009944, filed Jul. 30, 2021, and the entire contents of which are incorporated herein by reference, which claims priority to KR 10-2020-0096527, filed Aug. 3, 2020 and the entire contents of which are incorporated herein by reference.

TECHNICAL FIELD

The present disclosure relates to an anti-rotation device for a vehicle seat rail, and more particularly to an anti-rotation device for a vehicle seat rail configured to prevent rotation of an upper rail on the vehicle center side when a forward load is generated in a vehicle seat.

BACKGROUND ART

In general, a seat installed in a vehicle may be adjusted in position by sliding the same in the forward-and-rearward direction in consideration of the height and body type of an occupant. To this end, a seat rail configured to slide the seat and fix the position of the seat is provided under the seat.

A seat rail of the related art includes a lower rail mounted on a floor panel inside a vehicle, an upper rail coupled to a seat cushion frame and slidably installed on the lower rail, and a lock plate configured to limit sliding movement of the upper rail with respect to the lower rail. Here, the seat rails of the related art are respectively disposed at the left position and the right position under the seat.

In this case, the lock plate is formed to move integrally with the upper rail in a state of being coupled to the center part of the upper rail, and includes a plurality of locking teeth detachably meshed with teeth of the lower rail (that is, rail teeth).

Figure 6:
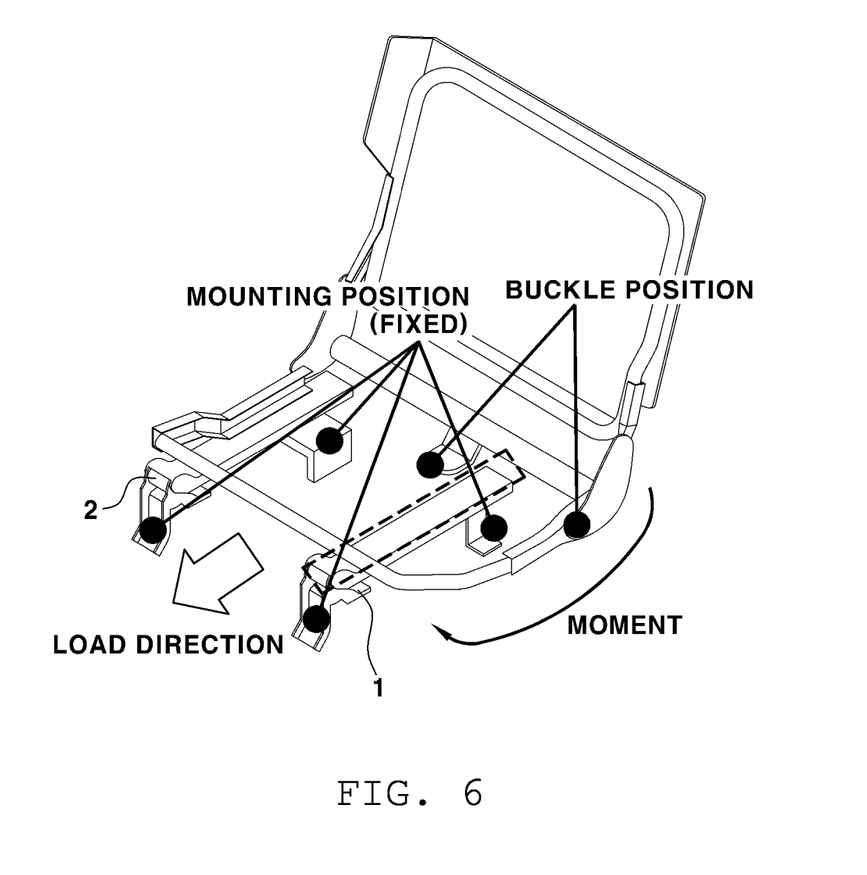
FIG. 6 is a view schematically showing a mounting position of a seat rail of the related art and a buckle position.

Further, referring to FIG. 6, a seat rail 1 on the left side and a seat rail 2 on the right side disposed under the seat are respectively mounted on the floor panel at the front and rear positions of the lower rail. Further, in the seat rail 1 on the left side and the seat rail 2 on the right side, buckles of a seat belt are respectively disposed at the left and right positions of the seat rail 1 on the center side of the vehicle.

Here, when a forward load is excessively applied to the seat, for example, in the event of frontal collision of a vehicle, excessive rotational moment is generated depending on the mounting positions of the seat rails 1 and 2 and the buckle positions of the seat belt. Accordingly, rotation of the upper rail on the vehicle center side occurs.

Figure 7:
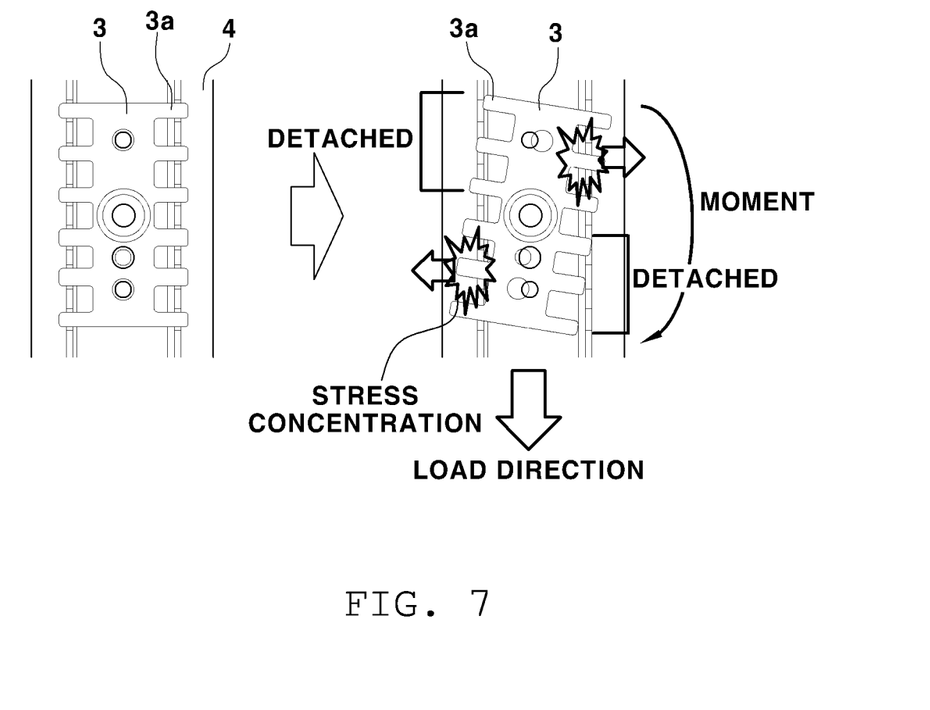
FIG. 7 is a view showing detachment of a lock plate of the seat rail of the related art.

As shown in FIG. 7, as described above, when the upper rail rotates, a part of locking teeth 3a of a lock plate 3 are detached from rail teeth of a lower rail 4, and as such, meshing between the lock plate 3 and the lower rail 4 deteriorates. Accordingly, some of the locking teeth are not evenly loaded, and stress is concentrated on the locking teeth that are not detached from the rail teeth of the lower rail, which causes breakage of the locking teeth. As a result, coupling strength between the upper rail and the lower rail deteriorates.

DISCLOSURE

Technical Problem

Therefore, the present device has been made in view of the above problems, and it is an object of the present device to provide an anti-rotation device for a vehicle seat rail, configured to prevent rotation of an upper rail on the center side of a vehicle when a forward load is applied to a vehicle seat and to prevent breakage of a lock plate due to the rotation of the upper rail.

Technical Solution

In accordance with the present disclosure, the above and other objects can be accomplished by the provision of an anti-rotation device for a vehicle seat rail, the anti-rotation device including a lower rail unit mounted on a floor panel inside a vehicle, an upper rail unit coupled to a seat cushion frame and slidably assembled to the lower rail unit, a lock plate mounted on the upper rail unit so as to move integrally with the upper rail unit and detachably coupled to the lower rail unit, wherein the lock plate limits sliding movement of the upper rail unit with respect to the lower rail unit, a hook plate including an upper part fixed to an inner sidewall part of the lower rail unit and a lower part formed to protrude downwards up to a lower position of the lower rail unit, and a hook member including an upper part coupled to an upper part of the upper rail unit and a lower part formed to surround the lower part of the hook plate, wherein the hook member prevents rotation of the upper rail unit while being caught on the lower part of the hook plate when the upper rail unit rotates.

The upper rail unit may include an upper rail slidably assembled to the lower rail unit and a set bracket stacked on and fixed to an upper end of the upper rail.

The hook member may include an upper mounting part mounted on an inner sidewall part of the set bracket, a separation part formed to be integrated with a lower end of the upper mounting part, the separation part being disposed at a predetermined distance from the hook plate in a left-and-right direction, and a rail anti-rotation part formed to be integrated with a lower end of the separation part, the rail anti-rotation part being bent upwards so as to surround the lower part of the hook plate formed to protrude downwards below the lower rail unit.

The hook member may further include a gap generation part formed to be bent between the upper mounting part and the separation part, and the separation part may be positioned to protrude further toward a vehicle center side than the upper mounting part depending on a width of the gap generation part.

Advantageous Effects

According to the present disclosure, when a forward load is applied to a vehicle seat, rotation of an upper rail unit on the center side of a vehicle is prevented by a hook plate and a hook member, thereby making it possible to prevent breakage of a lock plate due to the rotation of the upper rail unit. Accordingly, it is possible to improve deterioration in meshing between the lock plate and a lower rail and deterioration in coupling strength between the upper rail unit and a lower rail unit due to the breakage of the lock plate.

DESCRIPTION OF DRAWINGS

The above and other objects, features and other advantages of the present device will be more clearly understood from the following detailed description taken in conjunction with the accompanying drawings, in which.

BEST MODE

Hereinafter, preferred embodiments of the present device will be described with reference to the accompanying drawings.

Further, matters in the accompanying drawings are illustrated to easily describe the embodiments of the present device, and may be different from actually implemented forms.

When a part "includes" or "comprises" a certain component throughout the specification, the part may further include or comprise other components without excluding the other components unless otherwise described.

The present disclosure relates to an anti-rotation device for a vehicle seat rail configured to prevent rotation of an upper rail on the vehicle center side when an excessive forward load is applied to a vehicle seat, thereby making it possible not only to prevent breakage of a lock plate due to the rotation of the upper rail, but also to prevent deterioration in coupling strength between the upper rail and a lower rail due to the breakage of the lock plate.

Figure 1:
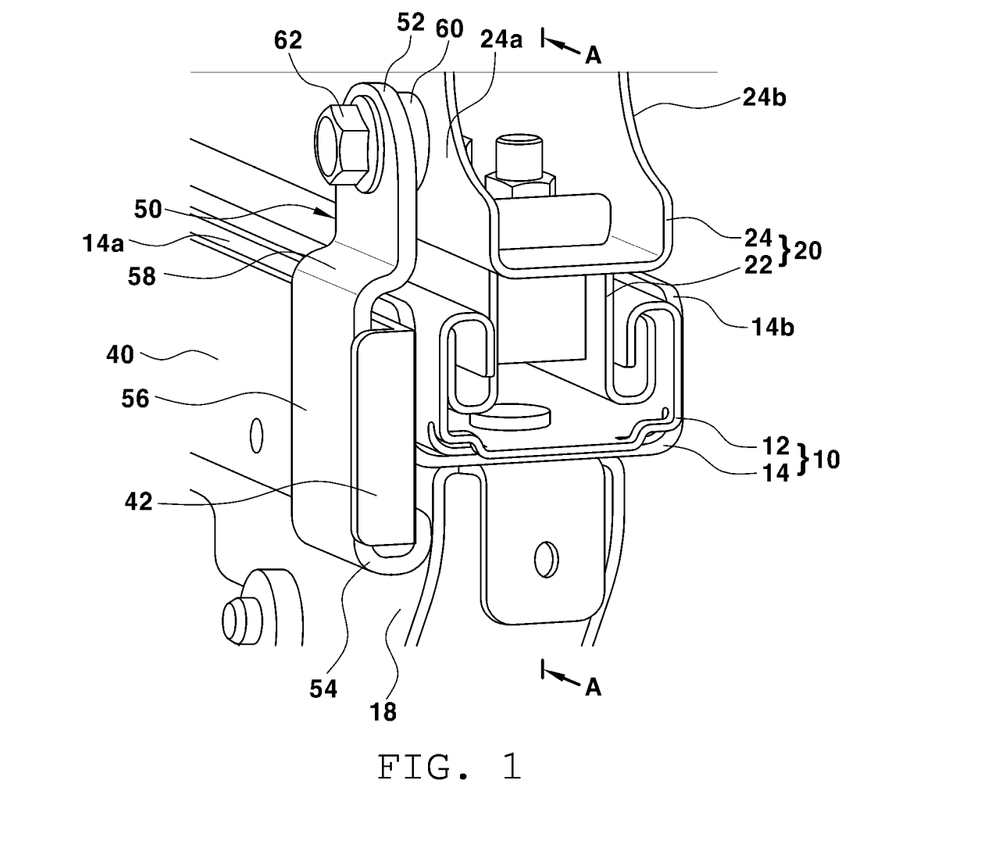
FIG. 1 is a perspective view of an anti-rotation device of a seat rail according to the present disclosure, seen from the rear.
Figure 2:
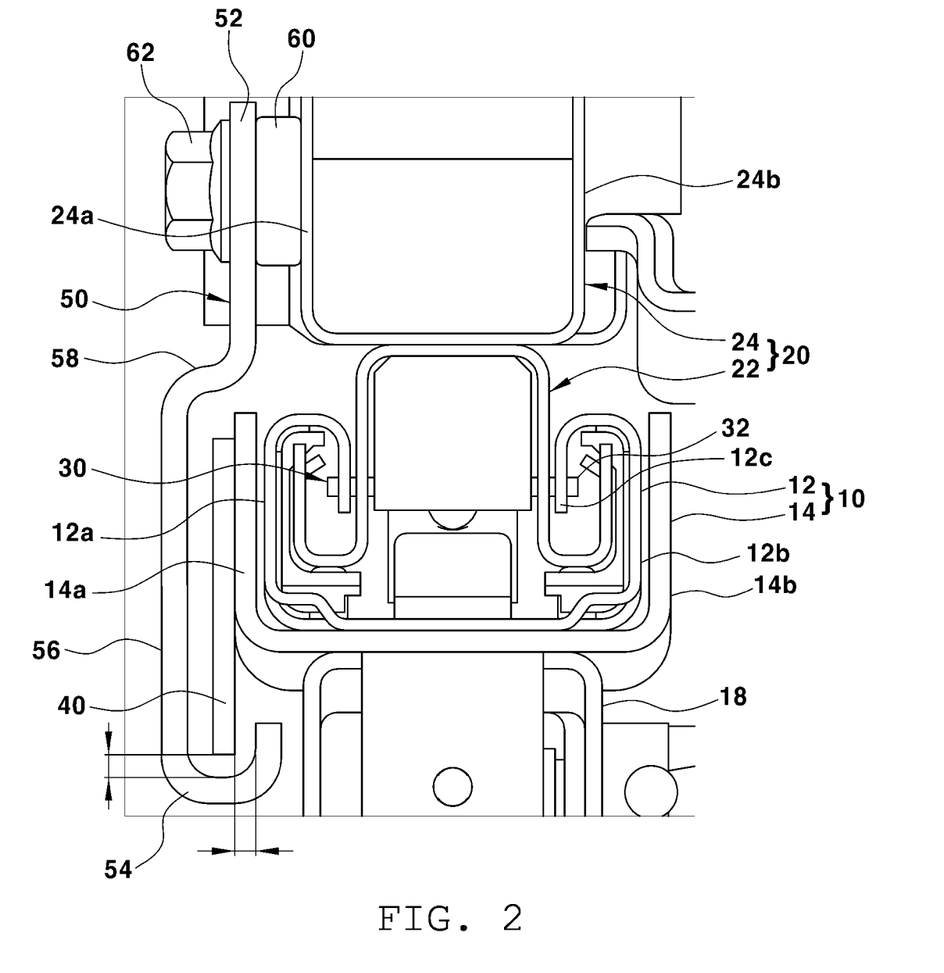
FIG. 2 is a view taken along line A-A in FIG. 1.

As shown in FIGS. 1 and 2, the anti-rotation device for the seat rail includes a hook plate 40 mounted on a lower rail unit 10 and a hook member 50 mounted on an upper rail unit 20.

The lower rail unit 10 is a part mounted on a floor panel F inside a vehicle and fixed thereto, and may include a lower rail 12 and a reinforcement bracket 14 configured to reinforce the lower rail 12.

The lower rail 12 may be formed to guide sliding movement of an upper rail 22, and may be formed, for example, in a substantially U-shaped cross-sectional structure with an open upper end.

Figure 5:
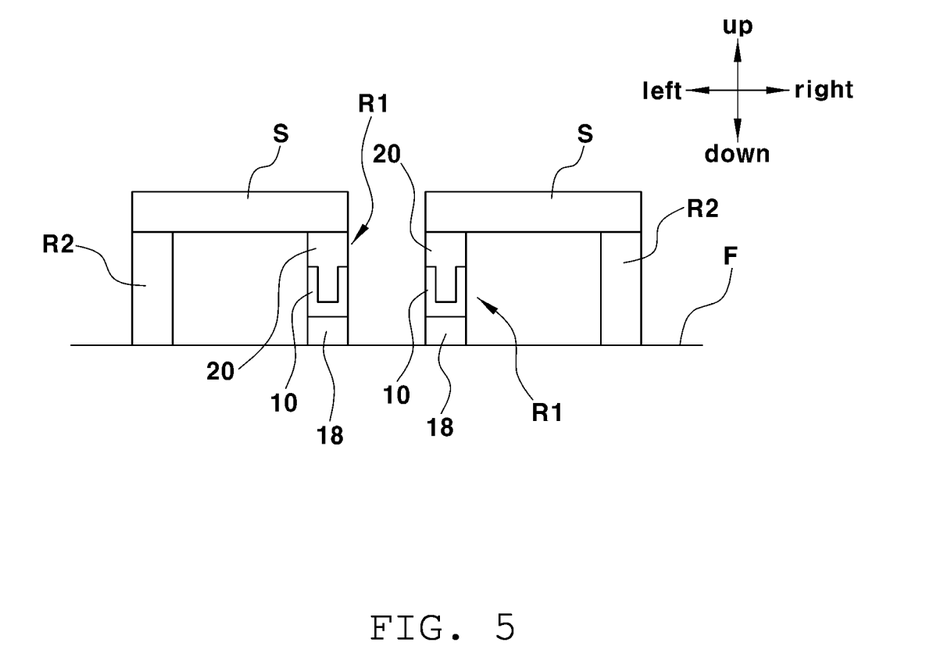
FIG. 5 is a view schematically showing the anti-rotation device of the seat rail according to the present disclosure.

As shown in FIG. 5, the reinforcement bracket 14 may be formed to have a structure surrounding the outer surface of the lower rail 12, and may be formed, for example, in a U-shaped cross-sectional structure similar to that of the lower rail 12. In this case, the reinforcement bracket 14 may be attached to and coupled to the lower surface of the lower rail 12.

As shown in FIG. 5, the upper rail unit 20 is a part coupled to a seat cushion frame S so as to move integrally with the seat cushion frame S. The upper rail unit 20 may include the upper rail 22 and a set bracket 24 stacked on the upper end of the upper rail 22 and fixed thereto.

The upper rail 22 is slidably assembled to the lower rail 12 and disposed therein, and has a center part thereof in the left-and-right direction, the center part being formed to protrude higher upwards than opposite side parts. In addition, the set bracket 24 is stacked on the center part of the upper rail 22 and coupled to the upper rail 22 so as to move integrally with the same.

The upper rail unit 20 and the lower rail unit 10 are detachably coupled to each other by a lock plate 30.

The lock plate 30 limits and releases sliding movement of the upper rail 22 with respect to the lower rail 12, and is mounted on the upper rail unit 20 and detachably coupled to the lower rail unit 10.

Specifically, the lock plate 30 is mounted on the center part of the upper rail 22 so as to move integrally with the upper rail 22, and has a plurality of locking teeth 32 formed at the edge portion thereof and arranged along the sliding direction of the upper rail 22.

The locking teeth 32 are detachably meshed with rail teeth 12c of the lower rail 12, and become separable from the rail teeth 12c when downward movement of the lock plate 30 is unlocked.

When the locking teeth 32 and the rail teeth 12c are meshed with each other, the sliding movement of the upper rail 22 with respect to the lower rail 12 is locked, and when the locking teeth 32 and the rail teeth 12c are separated from each other, the sliding movement of the upper rail 22 with respect to the lower rail 12 is unlocked.

The hook plate 40 is a plate-shaped member configured to prevent rotation of the hook member 50 coupled to the upper rail unit 20 so as to move integrally with the same, and is bonded to and fixed to the inner sidewall part of the lower rail unit 10. Further, the hook plate 40 may be formed to extend in the longitudinal direction of the lower rail unit 10 and in the sliding movement direction of the upper rail unit 20.

Specifically, the upper part of the hook plate 40 may be fixed to an inner sidewall part 14a of the reinforcement bracket 14, and the lower part thereof is formed to extend up to a lower position of the lower rail unit 10 (that is, a position between the lower rail unit and the floor panel inside the vehicle). Accordingly, the lower part of the hook plate 40 protrudes downwards below the lower part of the lower rail unit 10.

In this case, the lower rail unit 10 is supported to be positioned at a predetermined height from the floor panel F through a support member 18 fixed to the floor panel F.

When the reinforcement bracket 14 is not provided, the hook plate 40 may be bonded to and fixed to an inner sidewall part 12a of the lower rail 12.

Here, the inner sidewall parts 14a and 12a are sidewall parts disposed on the vehicle center side of the left and right sidewall parts of the reinforcement bracket 14 and the lower rail 12, and outer sidewall parts 14b and 12b are sidewall parts disposed on the vehicle door side of the left and right sidewall parts of the reinforcement bracket 14 and the lower rail 12. The hook plate 40 may be fixed to the outer surfaces of the inner sidewall parts 12a and 14a by welding.

In addition to the hook plate 40, the hook member 50 is also provided to prevent rotation of the upper rail unit 20. The hook member 50 is coupled to the upper part of the upper rail unit 20 (that is, the set bracket 24) so as to move integrally with the same, and is formed to extend up to a lower position of the hook plate 40 (that is, a position between the lower part of the hook plate and the floor panel).

Specifically, the upper part of the hook member 50 is coupled to the sidewall part on the vehicle center of the set bracket 24, that is, an inner sidewall part 24a, and the lower part thereof is formed to extend up to the lower position of the hook plate 40 so as to surround the lower part of the hook plate 40.

In this case, the hook member 50 may be formed to have a substantially J-shaped cross-sectional structure, thereby making it possible not only to prevent rotation of the upper rail unit 20 due to forward load, but also to enable the seat to perform normal sliding movement.

Here, non-described reference numeral 24b denotes a sidewall part on the vehicle door side of the set bracket 24, that is, an outer sidewall part 24b.

Specifically, the hook member 50 may be formed to include an upper mounting part 52, a separation part 56, and a rail anti-rotation part 54.

The upper mounting part 52 is a part coupled to and fixed to the inner sidewall part 24a of the set bracket 24. The upper mounting part 52 may be coupled to a weld nut 60 of the set bracket 24 through a bolt member 62.

The separation part 56 is a part integrally formed between the lower end of the upper mounting part 52 and the upper end of the rail anti-rotation part 54. Further, the separation part 56 is formed to be disposed at a predetermined distance from the hook plate 40 in the left-and-right direction in order to prevent interference with the hook plate 40 when the upper rail unit 20 slides. The separation part 56 may be formed in a flat plate structure and disposed parallel to the hook plate 40.

The rail anti-rotation part 54 is a part formed to be integrated with the lower end of the separation part 56 so as to interfere with the lower part of the hook plate 40 when the upper rail unit 20 rotates. Further, the rail anti-rotation part 54 may be formed to be bent upwards so as to surround the lower part of the hook plate 40 formed to protrude downwards below the lower rail unit 10.

Specifically, the rail anti-rotation part 54 may be formed to have a U-shaped cross-sectional structure, and as such, the lower part of the hook plate 40 is surrounded by the rail anti-rotation part 54 at the left, right, and lower positions of the hook plate 40.

In the case of a seat in which seat belt buckles are respectively disposed on both left and right sides of a seat rail on the center side of a vehicle, and, for example, in the case of a right seat among rear seats (that is, second row seats), when rotational moment is excessively generated by a forward load applied to the right seat while an occupant is seated, rightward (clockwise) rotation of the upper rail unit 20 on the vehicle center side is generated. In addition, when the forward load is applied to the seat, upward rotation of the upper rail unit 20 is generated while the seat belt is pulled by the occupant.

The rail anti-rotation part 54 is formed in a U shape so as to surround the lower part of the hook plate 40, thereby making it possible to surround the left side, the right side, and the lower side of the lower part of the hook plate 40. Accordingly, the rail anti-rotation part 54 interferes with the hook plate 40 (that is, the same is caught on the lower part of the hook plate) when rightward rotation and upward rotation of the upper rail unit 20 occur, and as such, rotation of the upper rail unit 20 may be prevented (refer to FIG. 4).

Figure 4:
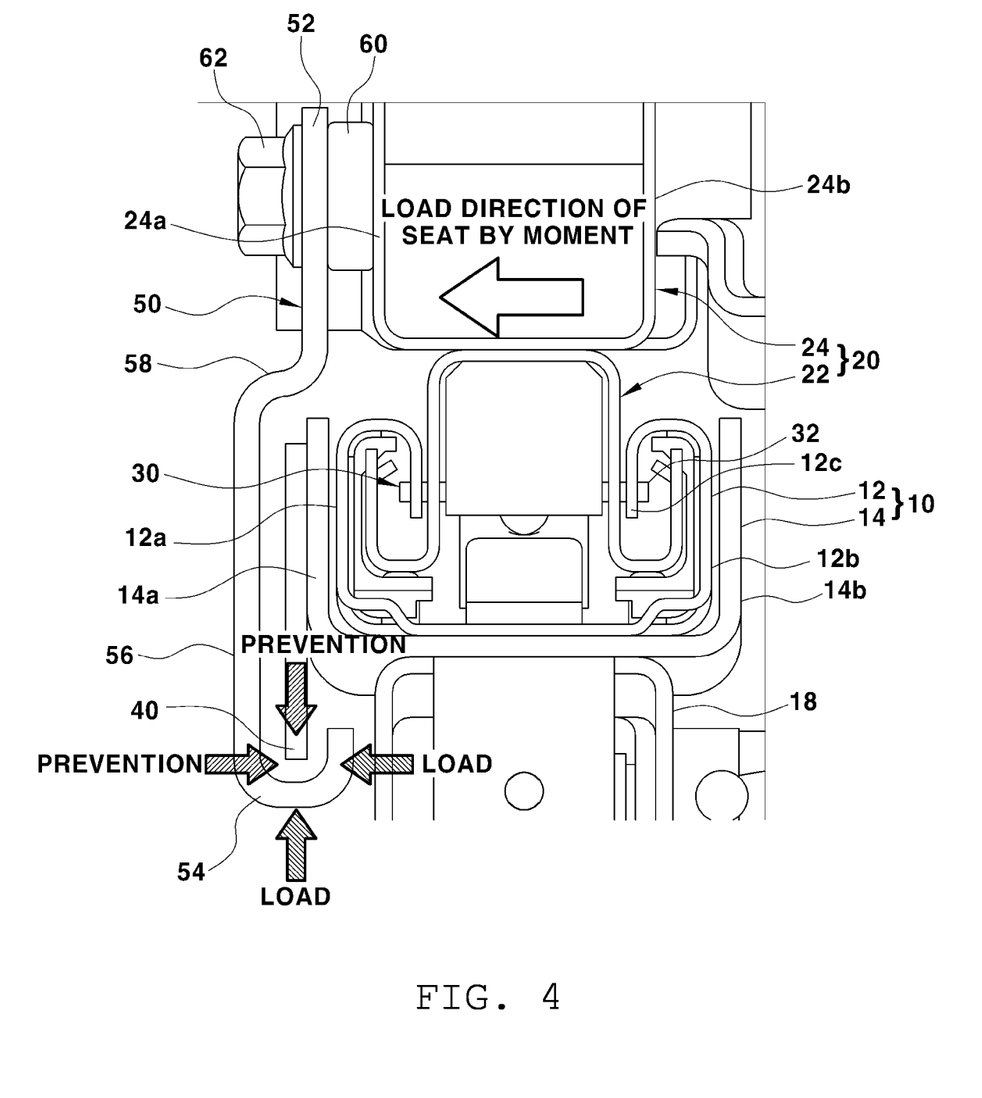
FIG. 4 is a view showing a method of preventing rotation of an upper rail unit through the anti-rotation device of the seat rail according to the present disclosure.

Furthermore, when rotation of the upper rail unit 20 does not occur, for example, when the upper rail unit 20 slides, the rail anti-rotation part 54 is formed to be disposed at a predetermined distance from the lower part of the hook plate 40 in the left-and-right direction and the upward-and-downward direction, thereby making it possible to prevent interference with the hook plate 40.

In addition, the hook member 50 may include a gap generation part 58 formed to be bent between the upper mounting part 52 and the separation part 56.

The gap generation part 58 is a part formed to be integrated with the lower end of the upper mounting part 52 and the upper end of the separation part 56. Specifically, the gap generation part 58 may be formed to be bent from the lower end of the upper mounting part 52 toward the vehicle center side so as to be connected to the upper end of the separation part 56.

Accordingly, the separation part 56 is positioned to protrude further toward the vehicle center side than the upper mounting part 52 depending on the width of the gap generation part 58 in the left-and-right direction, thereby making it possible to reduce thickness of the weld nut 60 mounted on the set bracket 24.

In the case of the weld nut 60 mounted on the set bracket 24, thickness of the weld nut 60 is determined depending on a distance between the hook member 50 and the lower rail unit 10. Therefore, when the gap generation part 58 is formed at the lower end of the upper mounting part 52, the thickness of the weld nut 60 may be reduced.

Figure 3:
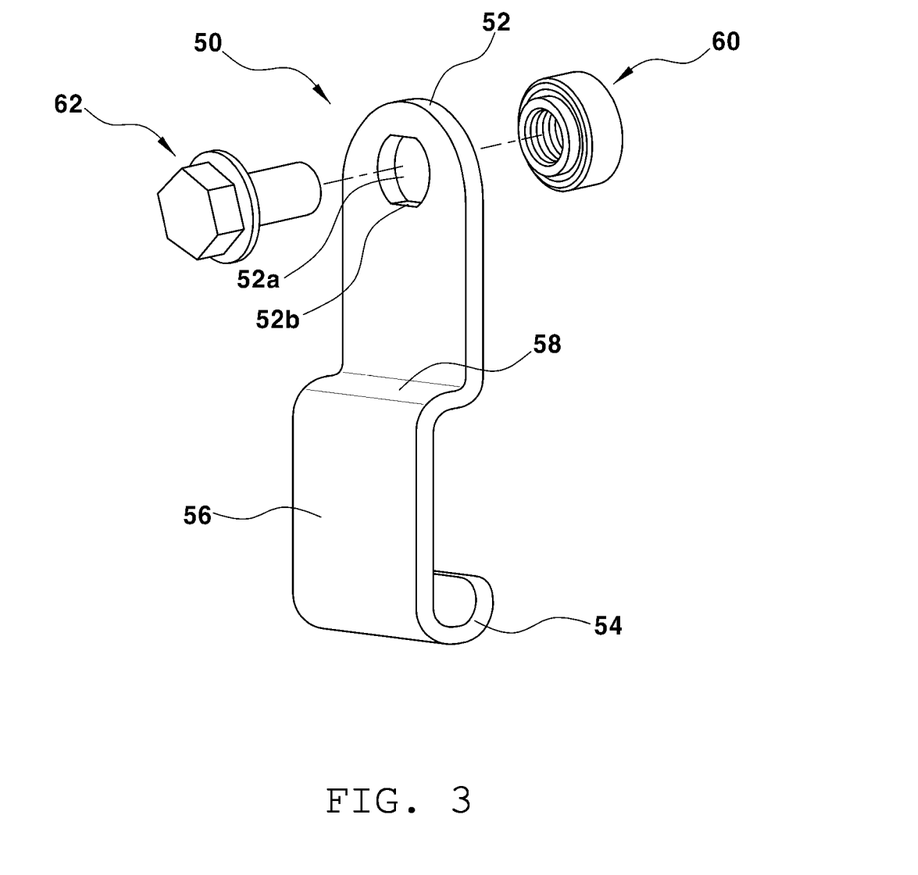
FIG. 3 is an exploded view showing a coupling structure of a hook member according to the present disclosure.

As shown in FIG. 3, the upper mounting part 52 has a coupling hole 52a formed therein, the coupling hole 52a with the bolt member 62 passing therethrough, and a flat portion 52b partly formed at a circumferential portion of the coupling hole 52a and configured to prevent loosening of the bolt member 62.

A part of the inner circumferential surface of the upper mounting part 52 surrounding the coupling hole 52a (that is, a part where the flat portion is formed) is formed as a plane. Accordingly, after the bolt member 62 is coupled to the weld nut 60 of the set bracket 24, it is possible to prevent the bolt member 62 from being rotated and loosened by vibration or the like.

Further, as shown in FIG. 1, the hook plate 40 may further include a hook anti-rotation part 42 configured to prevent the hook member 50 from rotating around the upper mounting part 52.

The hook anti-rotation part 42 may be formed by bending the same from the rear end of the hook plate 40 toward the separation part 56 of the hook member 50.

Meanwhile, as shown in FIG. 5, in a left seat rail and a right seat rail under the seat, that is, of a seat rail R1 disposed on the vehicle center side under the seat (that is, a seat rail on the vehicle center side) and a seat rail R2 disposed on the vehicle door side under the seat (that is, a seat rail on the door side), the hook member 50 and the hook plate 40 are mounted on the seat rail R1 on the vehicle center side where rotational moment is generated by a forward load.

That is, the hook member 50 and the hook plate 40 are mounted on the upper rail unit 20 and the lower rail unit 10 of the seat rail R1 on the vehicle center side, respectively.

FIG. 4 shows a method of preventing rotation of an upper rail unit on the vehicle center side when rotational moment is generated in a vehicle seat.

When a forward load is excessively applied to the vehicle seat, rightward rotational moment is excessively generated, and loads are respectively applied to the upper rail unit 20 and the hook member 50 in the rightward direction and the upward direction, as shown by arrows in FIG. 4. In this case, the rail anti-rotation part 54 of the hook member 50 is caught on the lower part of the hook plate 40, thereby preventing rotational movement of the hook member 50. Accordingly, rotation of the upper rail unit 20 is prevented, and as a result, it is possible to prevent the locking teeth 32 from being detached from the rail teeth 12c of the lower rail unit 10.

As described above, the embodiments of the present device have been described in detail, and the terms or words used in this specification and claims shall not be construed as being limited to typical or dictionary meanings. In addition, since the embodiments described in this specification and the configurations shown in the drawings are only preferred embodiments of the present device, the scope of the present disclosure is not limited to the above-described embodiments. Various modifications and improvements made by those skilled in the art using the basic concept of the present device defined in the following claims also fall within the scope of the present disclosure.

The invention claimed is:

1. An anti-rotation device for a vehicle seat rail, the anti-rotation device comprising:
    a lower rail unit mounted on a floor panel inside a vehicle;
    an upper rail unit coupled to a seat cushion frame and slidably assembled to the lower rail unit;
    a lock plate mounted on the upper rail unit so as to move integrally with the upper rail unit and detachably coupled to the lower rail unit, wherein the lock plate limits sliding movement of the upper rail unit with respect to the lower rail unit;
    a hook plate including an upper part fixed to an inner sidewall part of the lower rail unit and a lower part formed to protrude downwards below the lower rail unit; and
    a hook member including an upper part coupled to an upper part of the upper rail unit and a lower part formed to surround the lower part of the hook plate, wherein the hook member is configured to prevent rotation of the upper rail unit by being caught on the lower part of the hook plate when a rotational moment is applied to the upper rail unit.

2. The anti-rotation device according to claim 1, wherein the upper rail unit comprises an upper rail slidably assembled to the lower rail unit and a set bracket stacked on and fixed to an upper end of the upper rail.

3. The anti-rotation device according to claim 2, wherein the hook member comprises:
    an upper mounting part mounted on an inner sidewall part of the set bracket;
    a separation part formed to be integrated with a lower end of the upper mounting part, the separation part being disposed at a predetermined distance from the hook plate in a horizontal direction of the vehicle; and
    a rail anti-rotation part formed to be integrated with a lower end of the separation part, the rail anti-rotation part bent upwards so as to surround the lower part of the hook plate protruding downwards below the lower rail unit.

4. The anti-rotation device according to claim 3, wherein the hook member further comprises a gap generation part bent between the upper mounting part and the separation part such that the separation part is positioned farther from the upper rail unit in the horizontal direction of the vehicle than the upper mounting part.

5. The anti-rotation device according to claim 3, wherein the rail anti-rotation part is disposed at a predetermined distance from the lower part of the hook plate in the horizontal direction and a vertical direction of the vehicle.

6. The anti-rotation device according to claim 3, wherein the upper mounting part has a coupling hole through which a bolt member passes, the bolt member being coupled to a weld nut of the set bracket, wherein the coupling hole has a flat portion partly formed at a circumferential portion of the coupling hole, the flat portion preventing loosening of the bolt member.

7. The anti-rotation device according to claim 3, wherein the hook plate further has a hook anti-rotation part formed to be bent from a rear end thereof toward the separation part and configured to prevent the hook member from rotating around the upper mounting part.

8. The anti-rotation device according to claim 1, wherein the hook member and the hook plate are respectively mounted on the upper rail unit and the lower rail unit of the seat rail disposed on a vehicle center side among seat rails under a seat.

* * * * *